Sept. 18, 1956  J. D. CUMMINGS  2,763,236
PIPE TREATING EQUIPMENT
Filed Oct. 26, 1953. 9 Sheets-Sheet 1
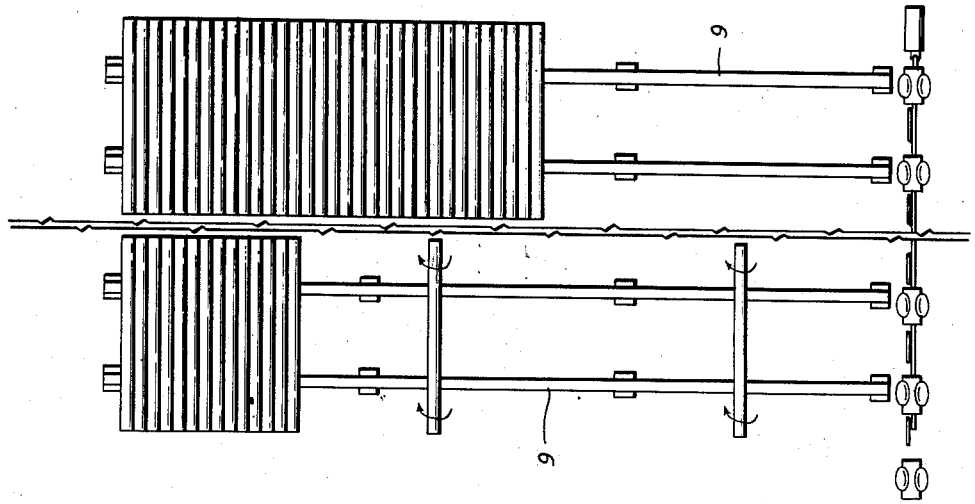
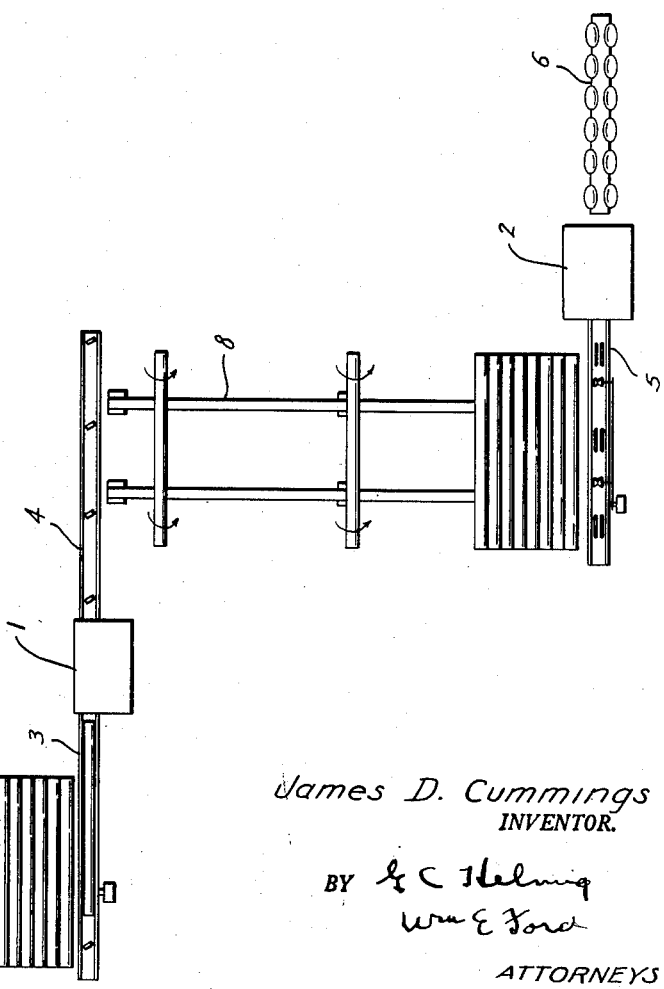
Fig. 1
James D. Cummings
INVENTOR.
BY
ATTORNEYS Sept. 18, 1956  J. D. CUMMINGS  2,763,236
PIPE TREATING EQUIPMENT
Filed Oct. 26, 1953  9 Sheets-Sheet 2
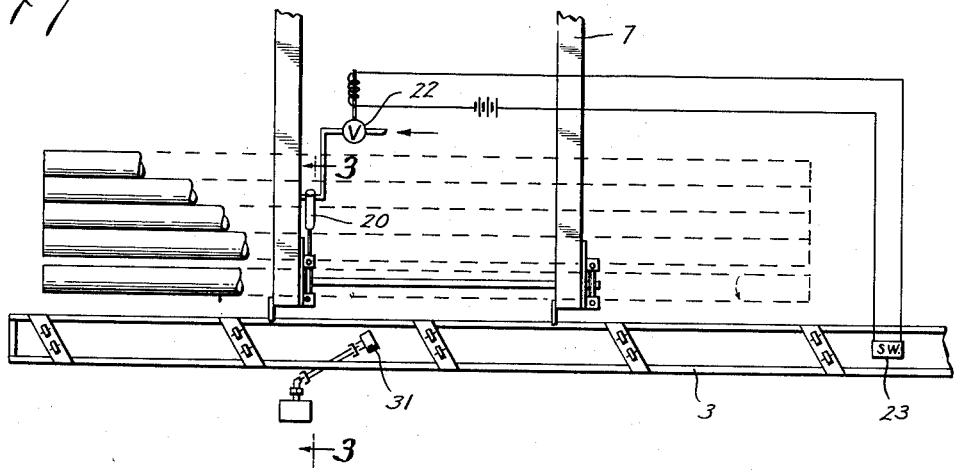
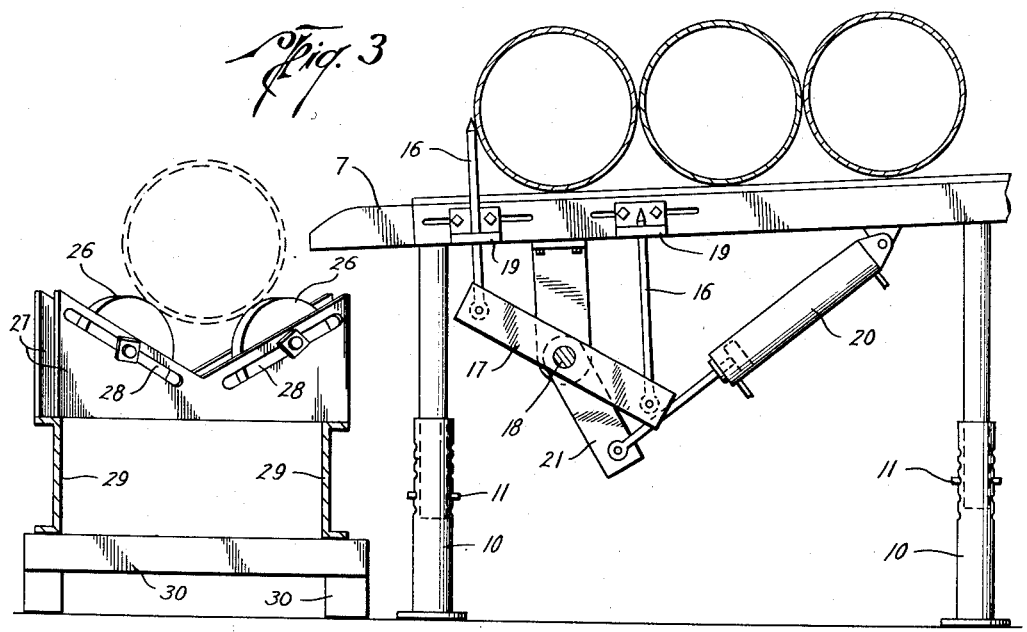
James D. Cummings
INVENTOR.
ATTORNEYS

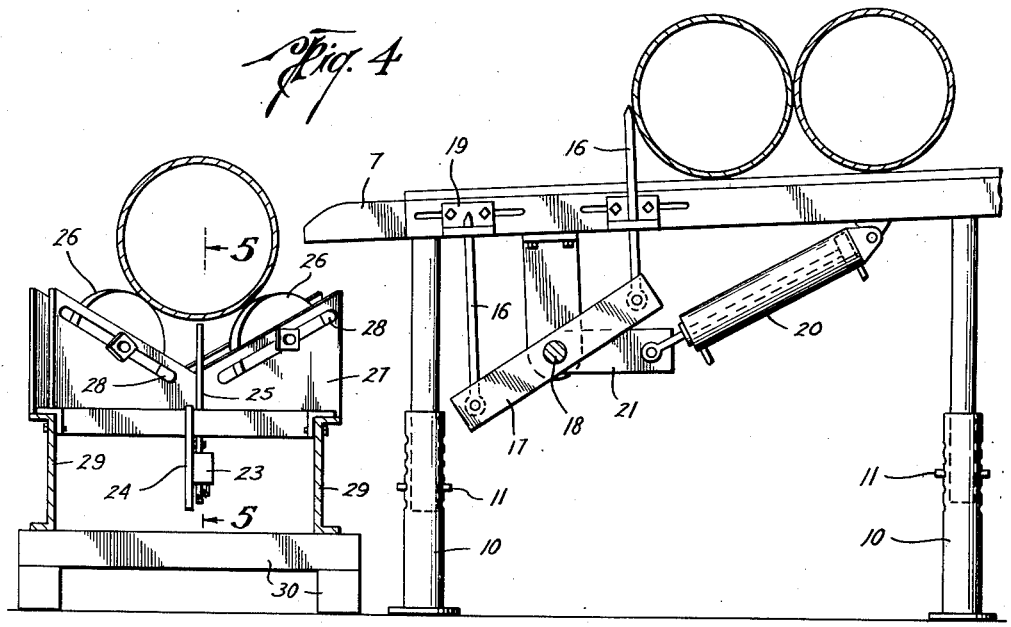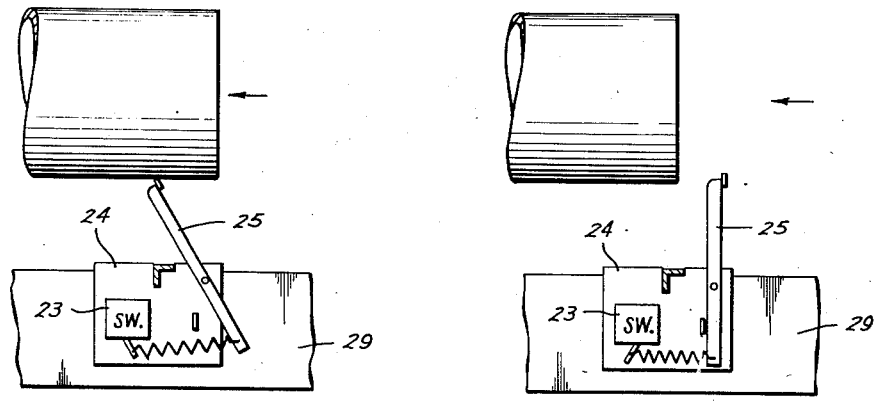

Sept. 18, 1956 J. D. CUMMINGS 2,763,236
PIPE TREATING EQUIPMENT
Filed Oct. 26, 1953 9 Sheets-Sheet 4
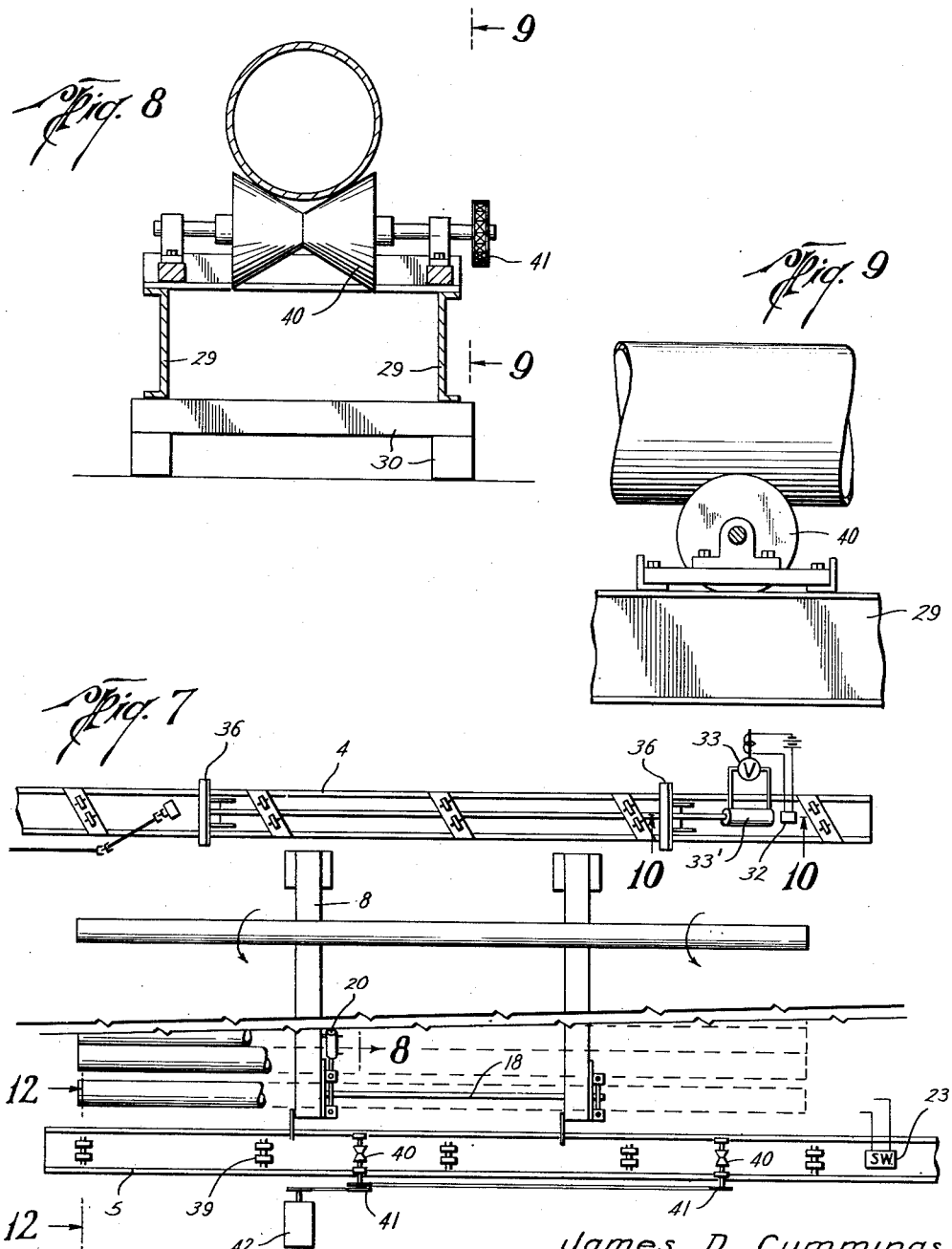
James D. Cummings
INVENTOR.
BY G C Helming
wm E Ford
ATTORNEYS Sept. 18, 1956    J. D. CUMMINGS    2,763,236
PIPE TREATING EQUIPMENT
Filed Oct. 26, 1953    9 Sheets-Sheet 5
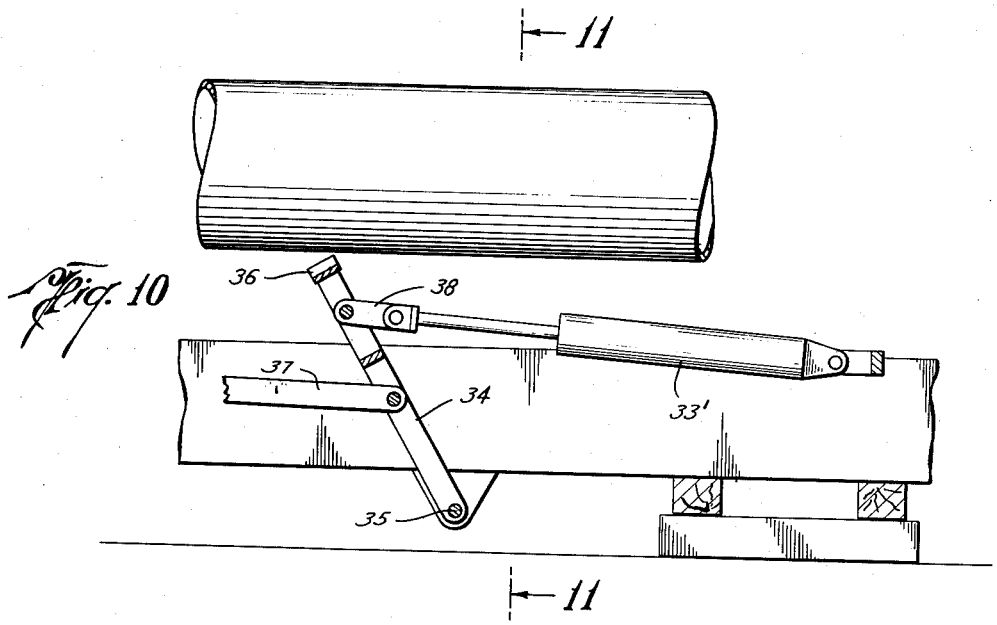
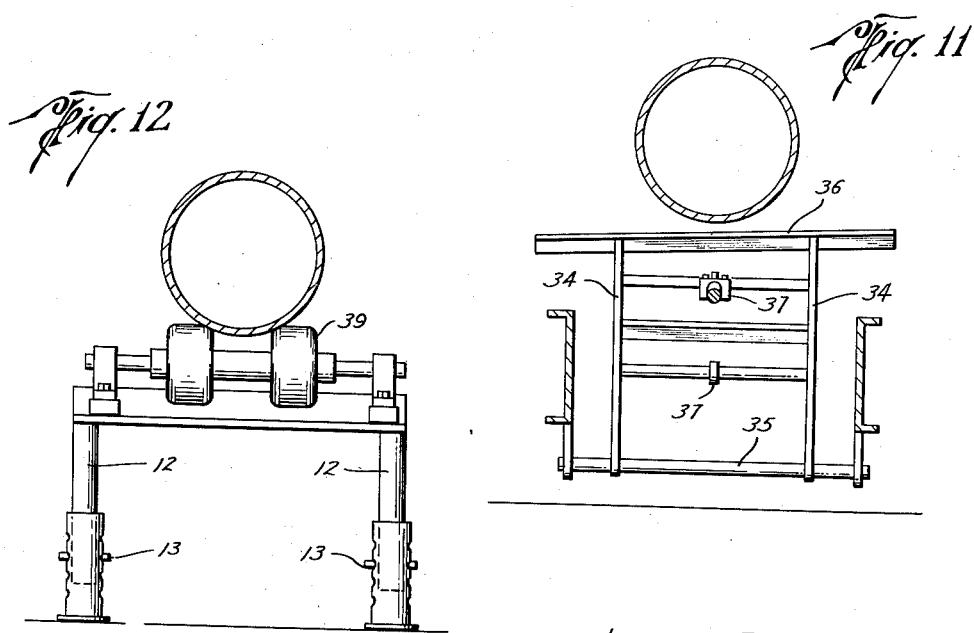
James D. Cummings
INVENTOR.
BY G C Helming
Wm E Ford
ATTORNEYS

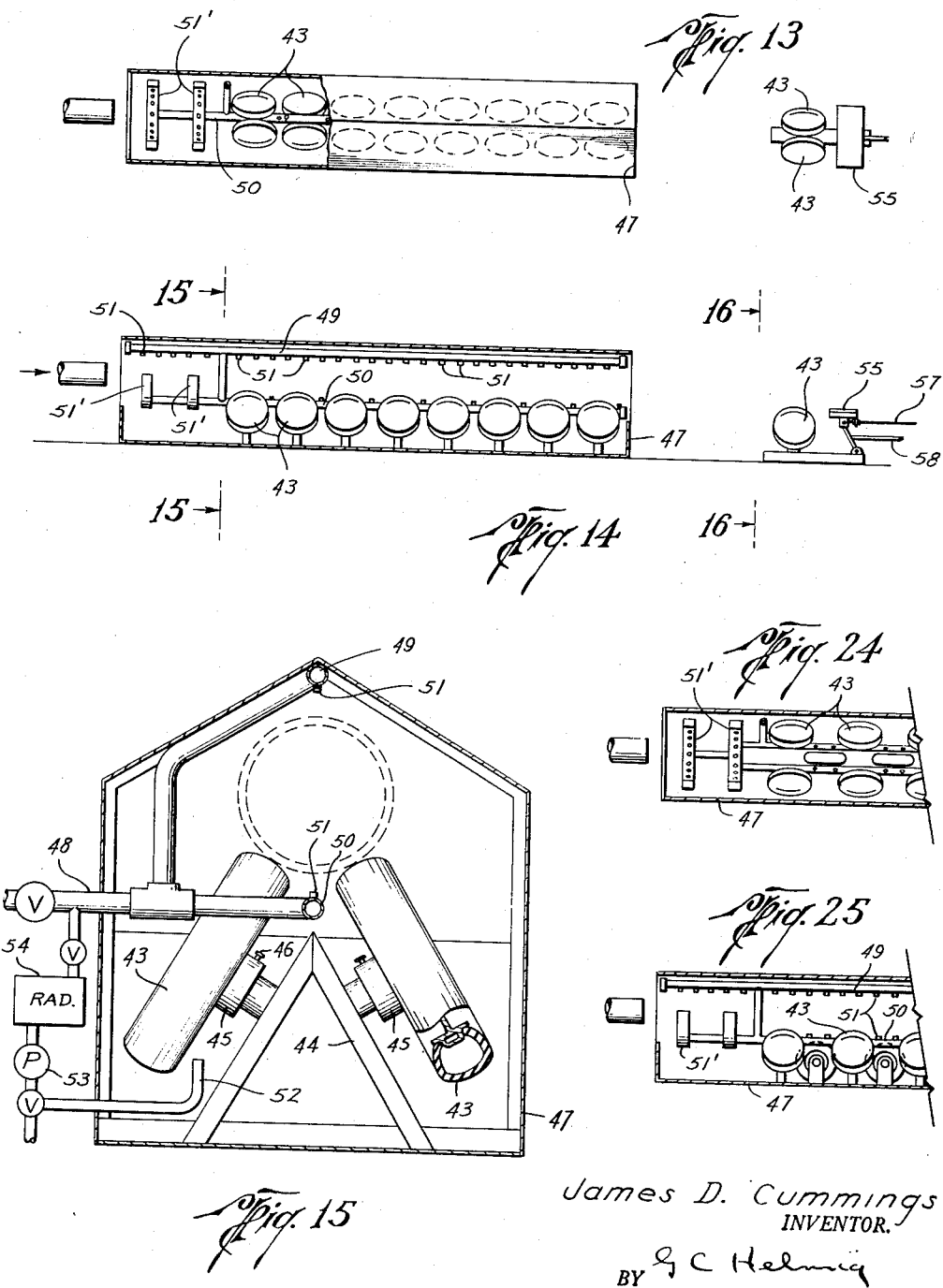

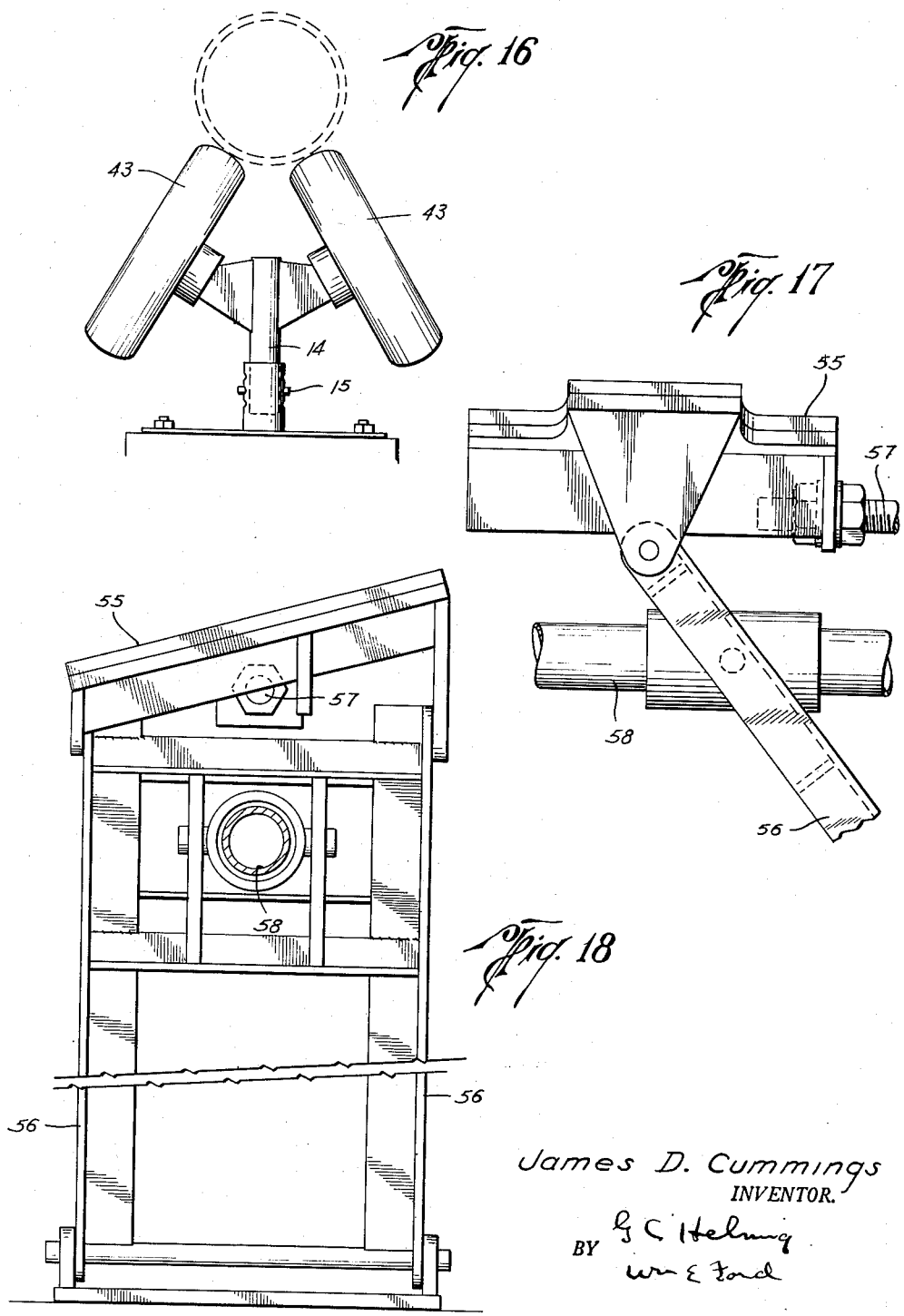

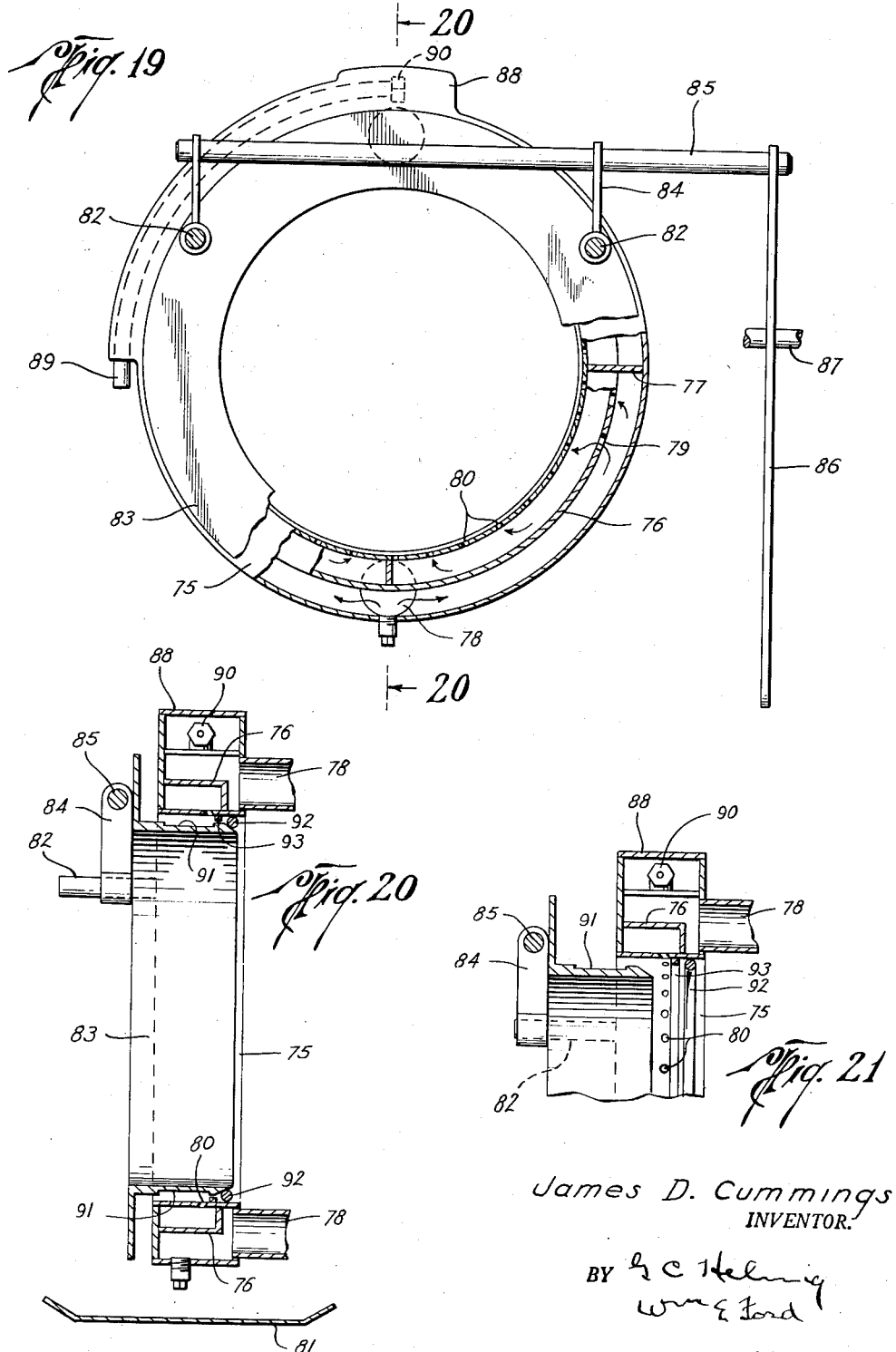

Sept. 18, 1956  J. D. CUMMINGS  2,763,236
PIPE TREATING EQUIPMENT
Filed Oct. 26, 1953.  9 Sheets-Sheet 9

James D. Cummings
INVENTOR.

BY G C Helmig
Wm E Ford
ATTORNEYS

_United States Patent Office_

2,763,236
Patented Sept. 18, 1956

2,763,236

PIPE TREATING EQUIPMENT

James D. Cummings, Houston, Tex., assignor to Crutcher-Rolfs-Cummings, Inc., Houston, Tex., a corporation of Texas Application October 26, 1953, Serial No. 388,305

20 Claims. (Cl. 118—69)

This invention relates to the application of a corrosion resistant coating to conduits and more particularly to improved equipment for automatically handling and treating pipe sections in continuous sequence from the time the pipe is deposited on initial feeding racks until it is placed on final storage racks.

Underground pipe lines such as are used for cross-country transporation of gas and oil are customarily coated on the outside with a protective layer of a petroleum asphalt or a coal tar derivative and because of the tacky nature of the coating a wrapping of paper sheaths the coating for handling purposes. Coating yards are often set up at locations convenient and reasonably close to where the pipe line is being laid and the yard equipment is moved from time to time as pipe line completion progresses. It is an object of the present invention to provide equipment which, while usable for permanent factory installation, is especially adapted for yard treatment and comprises a number of subassembly units for ease of handling and transportation, and arranged to be set up in co-operating relation without costly advance preparation of the yard terrain.

A further object of the invention is to provide equipment embodying power actuated devices for handling and continuously advancing the pipe through the treatment machines with a minimum of attention and manual effort and responsive automatically to pipe advancing position for pipe transfer between storage racks and conveyors leading to and from the treating machines.

Another object is to provide for quick initial cooling and setting of the hot applied coating immediately adjacent pipe discharge from the hot coating machine and in a region of unsupported traveling pipe whereby a sufficient surface hardening occurs to prevent deformation or displacement of the coating and surface depressions or dents under the weight of the pipe as its surface finally comes to rest on the conveyor leading from the discharge side of the coating machine and which conveyor provides yieldable cushioning or rolling contact on wide areas at a succession of longitudinally spaced points for low unit loading and distribution of strain with any given point on the pipe surfaces in but momentary contact at each roller support and free of pressure in the interval between succeeding roll contacts for further heat dissipation and coating set up. For the rapid absorption of heat a fluid cooling medium is directed and copiously flooded against the wall surfaces immediately upon leaving the coating machine, and prior to application of load pressure on the coating. A major portion of the heat is dissipated before transference of weight through the coating.

A further object of the invention is to provide an improved cut-off to intercept and return to the sump the continuously sprayed hot coating material when application of the coating to the pipe is temporarily discontinued. This enables continued circulation of the hot viscous gooey material through the spray shoe to avoid clogging and ripping such as occurs when circulation is stopped either by shutting down the pump operation or the closing of a circulation cut-off valve. Arrest of spraying intervals not only is necessary for machine adjustments but also enables opposite ends of pipe sections passing through the machine to remain uncoated and clean for subsequent welding or other coupling of pipe sections in end to end relation at the point of pipe line installation.

Additional objects and advantages will become apparent during the course of the following specification having reference to the accompanying drawings wherein Fig. 1 is a top plan view of a yard layout of the complete pipe treating installation.

Fig. 2 is a top plan fragmentary view of the discharge end of the initial pipe storage rack for feeding the conveyor leading to the cleaning and priming machine.

Fig. 3 is an enlarged view showing the parts of Fig. 2 in side elevation as viewed on line 3—3 of Fig. 2.

Fig. 4 is a view corresponding to Fig. 3 illustrating a different relative position of the pipes.

Fig. 5 is a detail elevation as on line 5—5 of Fig. 4.

Fig. 6 is similar to Fig. 5 with the parts in a different relative position.

Fig. 7 is a top plan view of a paint drying rack extending between the conveyors which lead from the priming machine and to the coating machine.

Fig. 8 is a transverse section of a conveyor as on line 8—8 of Fig. 7.

Fig. 9 is a side elevation as on line 9—9 of Fig. 8.

Fig. 10 is a side elevation of a portion of a pipe transfer mechanism as on line 10—10 of Fig. 7.

Fig. 11 is a transverse section on line 11—11 of Fig. 10.

Fig. 12 is a transverse section of the conveyors as on line 12—12 of Fig. 7.

Figs. 13 and 14 are, respectively, a top plan view and a vertical longitudinal section of the conveyor and heat absorbing apparatus leading from the hot coating machine.

Fig. 15 is a transverse section on line 15—15 of Fig. 14.

Fig. 16 is an end elevation of a portion of the conveyor as on line 16—16 of Fig. 14.

Figs. 17 and 18 are, respectively, a fragmentary side elevation and an end elevation of a pipe lifting crank arrangement.

Fig. 19 is an end view, partly in section, of a coating applicator shoe.

Figs. 20 and 21 are vertical sections both taken on line 20—20 of Fig. 19 and showing a spray intercepter in operative and inoperative relations.

Figs. 24 and 25 are fragmentary top plan and end elevations respectively of an alternate wheel conveyor arrangement.

Figure 22:
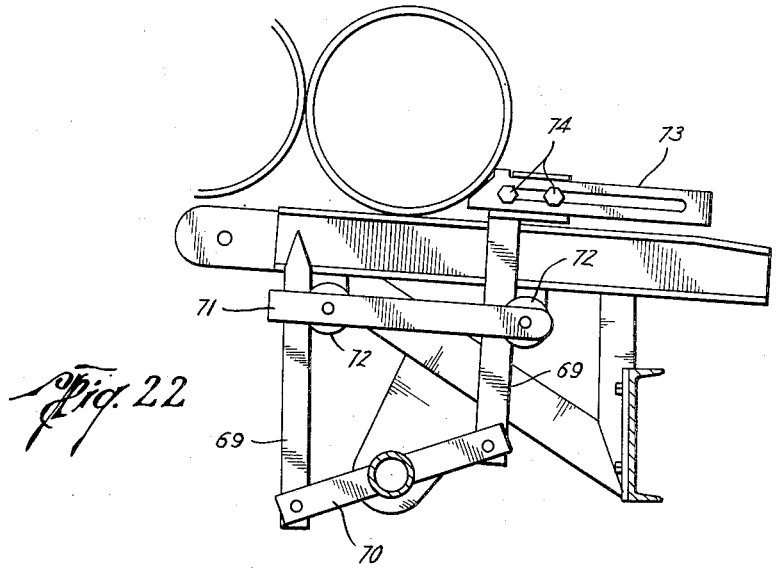
Fig. 22 is a fragmentary side elevation of a modified escapement mechanism.

Referring first to the yard layout shown in Fig. 1, the reference numerals 1 and 2 indicate respectively, a cleaning and priming machine and a coating machine which can be any of several well known conventional types. A satisfactory pipe cleaning and priming machine is one which has circular series of brushes to scrub the traveling pipe surface for cleaning it of dirt accumulation and also has a sprayer head or a flow discharge pipe for flowing a stream of a suitable enamel or thinned down paint on the cleaned pipe and which is spread around the surface by a circular array of fabric wiper strips which conveniently are pieces of deep pile carpeting. This initial thin prime coat when dry gives a corrosion resistant surface, but more particularly it affords a base for better adherence of a thicker layer of enamel or tarry substance to be later applied at the coating machine 2.

This heavy bitumen coating material flows when heated sufficiently and is applied as a hot liquid to pipe traveling axially through the machine 2 by one or more spray shoes and ordinarily the sprayed on coating is then immediately wrapped in a kraft paper and sometimes also by a reinforcing felt or fiber glass in advance of the paper. Both types of wrapping are applied from rolls rotatably carried around the pipe axis to cover the hot coating with a helically wound wrapping. The paper wrapping not only facilitates subsequent handling of the tarry coated pipe but it aids in protectively retaining and binding the hot coating layer to a more uniform thickness.

Associated with each machine for axial movement of pipe sections are feed and discharge conveyor subassembly units. A feed conveyor to the priming machine 1 is indicated at 3 and a discharge conveyor at 4 and a feed conveyor 5 leads to the coating machine 2 and a discharge conveyor 6 receives the finished coated pipe. Extending transversely of the several conveyors are pipe storage racks, each for holding a succession of axially parallel pipe sections and these racks preferably are inclined for the gravity advance toward their discharge ends of pipe sections received at their loading ends. Thus, the first of these racks 7 slopes toward the delivery conveyor 3 for the cleaning machine and is at a level above the paint-drying rack 8 which slopes downwardly toward the coating machine feed conveyor 5 and bridges the space from the cleaning machine discharge conveyor 4 while the final storage racks, each sloping away from the coating machine discharge conveyor 6, are the lowest of the racks. With the gravity advance of the racked pipe and power feed of axially conveyed pipe sections the travel of successive pipe sections proceeds continuously and entirely automatically from the time of loading on the rack 7 to storage on a rack 9.

While only two of the final storage racks are shown in Fig. 1, any number can be used depending on the rate at which finished pipe is hauled away from the yard. In the absence of ample hauling equipment, facilities for storing will need to be of such capacity as to take care of large quantities of pipe in view of the rapid rate of processing, which may be on the order of from seventy to ninety feet of pipe per minute through the treating machines 1 and 2. It should be mentioned that heretofore large storage capacity was needed because pipe coated by previous equipment and allowed to cool slowly in the atmosphere had to be stored for approximately twenty-four hours for bonding before the pipe could be hauled away. That storage delay is now eliminated by the complete cooling and a bond occurs in about one half of a minute. Therefore, the final storage racks are entirely unnecessary if enough hauling facilities are available for loading on vehicles as the processed pipe leaves the cooling bath. Transfer of successive pipe sections from the fed racks to the feed conveyors occurs by automatic release and gravity travel of pipe sections and as soon as a pipe section on the conveyor moves out of alignment with racked pipe, another pipe section deposits itself on the conveyor. Similarly, transfer of pipe sections from discharge conveyors to their receiving racks occurs automatically when a pipe section comes into alignment with the rack to receive it.

Each pipe support rack consists essentially of a pair of spaced rails on which pipe sections roll downwardly and the rails with suitable cross-ties and braces are supported by ground engaging posts or adjustable jacks which as best seen in Fig. 3, may comprise telescopic legs 10—10 having a series of vertically spaced openings for selective alignment and reception of a locking pin 11 to enable adjustable setting to fit the terrain, the height of the rack, and variation in slope of the rails. Varying the rail slope regulates the rate of gravity advance in accord with the size and weight of pipe sections being processed. The conveyor assembly may be shimmed or blocked up to fit the height of the racks as seen in Figs. 3 and 4. Fig. 12 shows telescopic support posts 12 having locking pins 13 to fit aligned openings selectively and Fig. 16 similarly shows telescopic posts 14 with a locking pin 15 for the units comprising the discharge conveyor leading to the final storage racks 9.

Figs. 2 to 6, inclusive, illustrate the transfer in succession of pipes racked in advance of the feed conveyor 3. There is involved the alternate operation of a pair of projectable-retractable plungers 16—16 above and below the upper face or tracking surface of the rack rails. The stack of pipe is held in place by the projection of one or the other of these plungers and an escapement action permits one pipe at a time to pass to the conveyor. In Fig. 3 all the pipes are retained by the projected plunger 16 and when the end or last pipe in the row is to be released this plunger is retracted with a simultaneous projection of the other plunger with the parts then in the relation shown in Fig. 4. This retraction and projection allows the lowermost pipe to roll from the rack to the conveyor with all other pipes remaining stationary. Return of the plungers to the Fig. 3 position releases the pipes to roll forward the distance of one pipe diameter until the escapement mechanism is once again tripped.

Two spaced apart pairs of feed plungers will maintain pipe alignment and these are conveniently mounted on the inclined rails of the rack. The plungers of each pair are pivotally connected at their lower ends to opposite ends of a rock bar 17, which bars are fast to opposite ends of a rock shaft 18. To guide the upper ends of the plungers, each slidably fits an aperture in the horizontal flange of an angle bracket 19 whose vertical leg is adjustably secured to an adjoining rail by fastening bolts slidable in an elongated slot in thek rail. Adjustment will crowd or spread the plungers toward and away from one another to satisfy variations in pipe diameters.

For power actuation of the escapement mechanism, a pneumatic or hydraulic piston and cylinder motor 20 is pivotally anchored at one end to a portion of the rack and is hinged at its other end to a rocker arm 21 fastened on the rock shaft 18. Air or other fluid under pressure is introduced into one or the other end of the cylinder under control of a solenoid operated valve 22 to which a supply of current is fed from a limit switch 23, best shown in Figs. 5 and 6. Here the switch is shown as carried on a mounting plate 24 adjustably located on the conveyor 3 beyond alignment with the pipe stack on the rack 7. Also mounted on the plate 24 is a pivoted trigger lever 25 having a coil spring tie with the switch blade. At its upper end the tripper lever 25 extends into the path of pipe traveling axially on the conveyor and so long as a pipe engages with the lever as seen in Fig. 5 the switch 23 controls the motor actuating valve 22 to set the plungers 16 in the retaining position of Fig. 3. When an advancing pipe section travels beyond the trip lever and the lever swings to the upright position of Fig. 6, then the fluid motor rocks the lever or bar 17 to locate the plungers 16—16 for the release of another pipe section while holding back the remaining pipes as shown in Fig. 4.

When the cleaning and priming machine is of the type in which the brushes are non-revolvable on the pipe surface, then relative rotation is had by rotating the traveling pipe. For pipe rotation the conveyor includes a series of spaced rollers or wheels 26 set on axes inclined to the direction of forward pipe travel to thereby inmpart a concurrent rotation to the pipe. The rollers are arranged in transversely spaced pairs to receive the pipe therebetween and each pair of rollers is mounted between a pair of plates 27 with the roller axles adjustably secured in angularly disposed elongated slots 28 by means of which adjustment of the rolls can be made to accommodate pipe diameters. The roll support plates 27 are mounted in longitudinally spaced relation on a pair of transversely spaced channels 29 tied together along their lower edges and rested on bolster or shim blocks 30. One or more motor driven friction drive wheels 31 (see Fig. 2) are arranged on axes parallel with the axes of the spaced rollers 26 to engage with the pipe in rotating or propelling it forward into the cleaning machine. Drive speed of the roller 31 is selected to impart to the pipe a rate of forward travel faster than that given to the pipe by the usual drive mechanism forming a part of the cleaning and priming machine 1 whereby to compensate for the gap or lag which otherwise would occur between the trailing end of the pipe section moving through the machine and the forward end of the next succeeding pipe section which necessarily reached the conveyor after its preceding pipe section had passed beyond interference to the loading of a new pipe section. Because of the faster rate of travel imparted to the new section the gap between the adjoining ends will decrease and close and thereafter the friction drive wheels 31 will slip in transmitting drive. If desired a slip clutch can be incorporated in the drive to the wheels 31. With the ends in abutment in their travel through the treating operation a continuous pipe surface is presented to the cleaning apparatus and the deposit of primer and the primer spreading or wiping cloths.

It will be understood that the axes of the conveyor drive and support wheels would be disposed at right angles to the direction of the conveyor travel if the advancing pipe is not to be rotated through the cleaning and priming machine as would be the case with a machine which employs rotating cleaning brushes. An advantage of rotating brushes sweeping a non-rotating pipe is that a bent pipe passes through the processing machine without the gyration which occurs when a bent pipe is rotated.

As the traveling pipe moves beyond the priming machine and is carried by the conveyor 4 into alignment with the loading zone of the rack 8, it is automatically transferred to the inclined rack and rolls by gravity toward the opposite end of the racks. For controlling transfer a limit switch 32 (see Fig. 7) generally similar to that shown in Fig. 5 is appropriately mounted with its trigger arm in the path of the oncoming pipe so as to be struck and tilted when the pipe reaches transfer position. Actuation of the switch 32 operates a solenoid valve 33 for the delivery of pressure fluid to a piston and cylinder motor 33'. The motor 33' is connected to a pair of longitudinally spaced apart crank or swinging arm assemblies each including (see Figs. 10 and 11) transversely spaced levers 34 pivoted or hinged at their lower ends on the conveyor frame by means of a shaft 35 and joined at their free swinging upper ends by a transverse ramp bar 36 inclined or sloped toward the rack 8. To minimize scuffing or scrapping of a freshly painted pipe surface the ramps should be relatively narrow and similarly the upper rail surfaces of the drying rack 8 can be of inverted V-shape to present a line or knife edge contact. A connecting rod 37 joins two crank arms assemblies for unisonal movement and the lifter crank assembly nearest to the actuating motor 33' is connected, as for example, by a clevis 38 to the power actuated piston rod.

Elevation of the lifting arms 36 is in a clockwise direction as seen in Figs. 7 and 10, or more particularly the pipe raising follows an arcuate path and is in the direction of pipe axial travel on the conveyor. By design the rate of forward lifting speed of the motor actuated cranks is much greater than the rate of conveyor propulsion so that the pipe section being raised moves ahead axially and out of end abutment with the next succeeding pipe section so as to clear it. Upon being raised by the inclined ramps the pipe rolls laterally down the ramp and is received by the rack 8. Release of the switch trigger actuates the motor for return retraction of the ramps below the path of the next succeeding pipe.

The distance between the receiving or loading end of the rack 8 and its discharge end is predetermined by pipe storage capacity to insure sufficient interval for paint drying or set up before a primed pipe advances to the point of discharge. Thus the prime coat will be conditioned for receiving the thicker bituminous coating. Escapement transfer mechanism similar to the alternately projected plungers shown in Figs. 2, 3, and 4, is arranged at the discharge end of the drying rack 8 for automatically feeding individual pipe sections in succession to the feed conveyor 5.

The feed conveyor 5 leading to the coating machine may have its frame set on bolsters or shims as shown in Fig. 8, or supported by adjustable legs shown in Fig. 12. As seen in Fig. 7 its pipe cradling rolls include a number of longitudinally spaced spool-like wheels 39 with one or more friction drive rollers 40 each comprising a pair of oppositely disposed frusto-conical sections presenting a V-shaped depression in which the pipe rides. A frame supported drive roll shaft is fitted with a chain driven sprocket 41 to be driven as by a motor 42 or by the power plant forming a part of the coating machine assembly. In either event, the drive gearing ratio should be selected to advance the pipe on the conveyor 5 at a rate faster than the rate of pipe travel through the coating machine in order to bring successive pipe into end to end abutment by the time they enter the coating machine. For some installations all of the several pipe supporting rolls of the conveyor 5 may be of the driven type.

The pipe delivered by the conveyor 5 to the coating and wrapping machine 2 receives its hot coating during continuous passage through the machine followed by the protective wrapping. Any pressure applied against the wrapping before substantial cooling or hardening occurs will displace and dent the hot sheath. Accordingly no support for the pipe is provided in a space of several feet beyond the point of wrapping and the pipe bridging the gap will be supported along the remainder of its length. In this unsupported region provision is made for rapid heat dissipation to quickly set the coating. A unique conveyor system is provided for the initially cooled pipe which is carried along without load concentration while further cooling takes place.

The cooling and conveyor system will be explained by reference to Figs. 13, 14, and 15. A succession of closely spaced pairs of relatively large diameter wheels 43 receive the pipe for a rolling low unit loading on the paper wrapping. The rotatable wheels of each pair are set in planes which converge upwardly and their treads form a valley at the top in which the pipe rides as the wheels rotate. Rubber or other soft resilient tread facings will further aid in protecting the pipe coating. As a practical expedient the flexibly treaded wheels may be conventional automotive wheels with inflated pneumatic tires. By control of inflation pressure of the tires individually, each can be distended in relation to others to carry its proportionate share of the load. Furthermore, control of air pressure enables regulation of the degree of softness or resiliency of the rolling bearing contact. The spindles of each pair are mounted on an A frame 44 to extend outwardly on divergently inclined axes. Each wheel spindle is affixed to a collar 45 slidable on a post and held by a set screw 46. This enables variation in transverse spacing or width of the pipe receiving valley to fit different pipe diameters.

When a wide wheel tread spacing is used for large diameter pipe, one or more vertically disposed wheels 43 may be interposed between the pair of inclined wheels as shown in Fig. 25. These centrally positioned wheels conveniently are in longitudinally staggered relation to the side wheels as can be seen in Fig. 24.

The A frames 44 support the wheels in a trough or well 47 to contain a cooling liquid preferably to a level above the bottoms of the wheel treads for taking away such heat as may be transferred from the pipe into the treads. Transference of heat from the wrapped pipe is taken care of primarily by flooding the pipe with an abundance of liquid immediately following the wrapping operation and in the region before the pipe reaches the succession of supporting wheels. This flooding takes place in a distance of about ten or twelve feet between pipe supports and with pipe lengths of thirty or more feet, the distance is easily spanned by the advancing pipe. Spraying for additional cooling continues as the pipe travels forward on the supporting wheels 43 until the temperature of the coating is sufficiently reduced that a substantial setting has occurred. Preferably as much as ninety per cent of heat absorption can taken place before support begins and cooling completed to atmosphere temperature at a slower rate by the time the pipe leaves the spray zone. The temperature of the coating material at the time of application should be just that at which the material is in liquid form for free flow so that a small drop in temperature after application lessens the tendency to flow and allows hardening to begin with a quick transition from liquid to a stiff plastic. Thus if the flow temperature is 500° F., a rapid change can be easily obtained with the use of an inexpensive cooling medium such as water at temperatures below its boiling point. While other forms of cooling may be employed, water has been found to be entirely satisfactory. The supply is introduced through a delivery pipe 48 feeding branches leading to longitudinally extending conduits 49 and 50 spaced above and below the path of pipe travel. Each conduit 49 and 50 carries a series of spray nozzles 51 directed toward the coated pipe and they are preferably greater in number in the region immediately beyond the coating machine where the pipe is the hottest. One or more upwardly directed half ring sprayers 51' are located at the forward end of the lower branch pipe 50 for an abundant delivery of cooling liquid against the pipe underside in advance of roller wheel support for the pipe underside. There is an initial concentration of delivery nozzles ahead of the supporting wheels and much of the heat is carried away before the pipe coating begins to rest on the wheels 43. The large number of closely spaced flexibly treaded wheels distributes the weight of the pipe on the rolling treads and no denting of the reduced temperature coating occurs. Continued flooding of the pipe as it traverses the wheel grouping for a distance of approximately thirty feet, sufficiently sets the coating to enable the conveyor supporting wheels beyond the water spraying zone to be spaced apart a greater distance and these additional wheels extend out into the yard for any desired distance, as determined by the number of storage racks necessary. After flooding the pipe and receiving the heat therefrom, the water drops into the collection tank 47 having the stand pipe 52 or other suitable drainage means for carrying away water in excess of the level desired.

Location of the coating yards can often be selected adjacent a running stream, a pond, or other source of cooling water and when the supply is ample the water can be piped to and from the cooling system without reuse. Otherwise, the supply can be circulated with the addition of makeup water and for that purpose the outlet pipe 52 may have a valved connection with the suction side of a pump 53 which discharges through a valve connected with the delivery pipe 48. Should dissipation of heat from the cooling medium become desirable, a suitable heat exchanger or air-cooled radiator 54 may be inserted beyond the pump 53 in advance of the delivery nozzles. Optionally, a supply of ice could be added periodically to the supply tank if unusual heat conditions are encountered.

After the coated pipe has been sufficiently cooled by the liquid that depressions in the surface are unlikely to occur, it passes from the spray zone and in some installations is machine coated with heat reflection white wash. It continues to move outward on the conveyors and is transferred to storage racks, or if desired, directly onto hauling vehicles. At the loading end of each storage rack 9 or at a waiting vehicle as the case may be, a pipe transfer rack will be provided to lift the pipe and allow it to roll onto the inclined rack rails or onto a vehicle bed. Both the rails and the transfer ramps should be relatively wide as distinguished from the narrow rack 8 and ramps 36 for the primed pipe and the wider surfaces are preferably covered with cushion pads such as strips of carpeting so as to protect the wrapping. Instead of stiff rack rails, smooth and wide flexible belting may be employed to support the pipe.

A pair of transfer ramps for each storage rack may be constructed as shown in Figs. 17 and 18 and include an inclined top plate 55 pivoted on the free ends of a pair of swinging levers or cranks 56 pivotally mounted at their lower ends. A tie rod 57 joins the pivoted top plates to complete a parallelogram and maintain the plate surfaces in alignment. A longitudinally extending connecting rod 58 joins the swinging frame assembly with an operating motor to be triggered into action by movement of pipe into position to be transferred to a selected rack. Swinging ramp travel is at a rate faster than pipe conveyor travel for proper endo. From the time a pipe is placed on the first feed rack, its travel to the end of the operation occurs entirely automatically.

Figure 23:
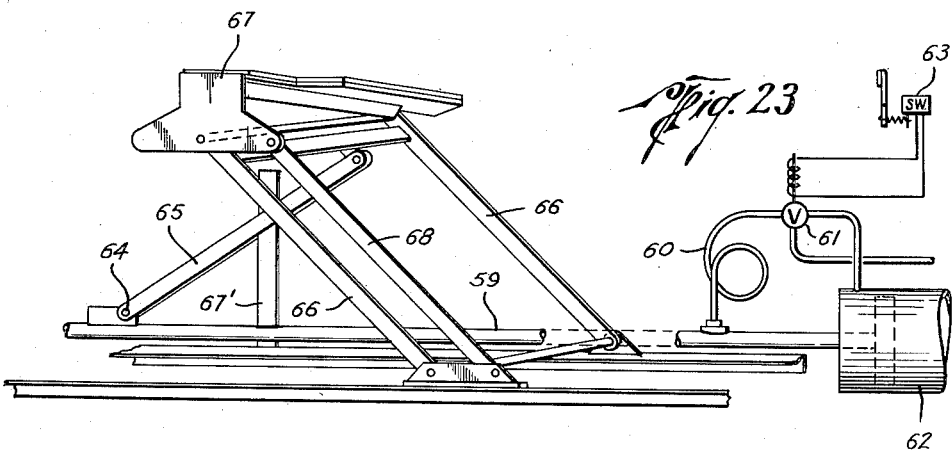
Fig. 23 is a persepective view of a pipe elevating assembly for transfer of pipe sections from a conveyor to a storage rack.

A trigger actuated switch and motor unit may be installed at the transfer ramps for each rack with the trigger set up manually for projection into the path of the pipe according to the rack selected for loading. Alternately the connecting rod 58 may be extended along the whole length of the conveyor containing the several ramps for detachable connection with any given pair of rams. In that case a single motor will be employed and the trigger switch will be moved from one location to another as desired. This latter arrangement is especially feasible with the transfer mechanism of Fig. 23 wherein the connecting rod 59 is illustrated as a hollow pipe to serve as a conduit for pressure fluid. Pressure fluid supplied through the farther end of the pipe is taken off through a flexible hose 60 and fed by a solenoid operated valve 61 to one or the other ends of a piston cylinder 62 whose slidable piston is fast with the connecting rod or hollow pipe 59. The trigger switch 63 can be placed at a selected rack for automatic operation and detachable pins as at 64 can be used to couple the connecting rod 59 with the ramps of any pair. That is, the pin 64 pivotally connects the drag link 65 with a cross bar between a pair of transversely spaced swinging cranks 66 having hinged at their outer ends a ramp plate 67. A link 68 of the same length as the crank arm and pivoted at opposite ends on axes equally spaced from crank 66 operates in affording parallelogram action to maintain the hinged ramp plate 67 in a plane parallel with the pipe axis. When not coupled by the drag bar 65 the ramp 67 will bottom or rest on a vertical post 67' below the line of pipe travel.

Fig. 22 shows an optional form of escapement for feeding one pipe at a time from the storage racks to the conveyors. In this case the lower ends of the projectable plungers 69—69 are pivoted to a rock lever 70 and their upper ends are received in a guide assembly 71 including anti-friction rollers 72 which receive thrust by a rolling contact with the edges of the plungers. One of the plungers carries a channel section terminal head in which is slidably pocketed a bar 73 terminating in a pipe engaging seat and having an elongated slot to receive a pair of clamp studs 74 whereby the bar 73 and its seat may be set in spaced relation with the pipe engaging tip of the companion plunger to suit the diameter of the pipe being operated upon. Alternate projection and retraction of the plungers 69 will be controlled by a fluid motor and limit switch as previously described in connection with Figs. 2 to 6 inclusive.

The layer of corrosion resistant material is applied to the traveling pipe by a spray system including one or more spray shoes or hollow containers with a group of spray nozzles or small openings facing the path of the pipe through the machine. The shoe is warmed by hot circulating liquid and the spray nozzles remain open in the absence of a temperature drop. Since the flow temperature is somewhat cirtical and several times that of the surrounding atmosphere, it has a high initial rate of temperature drop and in order to maintain the high temperature and avoid clogging, it is here proposed to continue liquid flow circulation through the shoes at all times and throughout those intervals when pipe is not being coated. For that purpose a special cut-off shield is employed for projection into the path of the sprayed coating to intercept the same and direct the material back to the sump for recirculation.

Fig. 19 shows an annular coating shoe 75 to surround the traveling pipe. Its interior hollow space is divided by a partition 76 into inner and outer chambers. Radial partitions 77 at about the horizontal center line may be used to separate the shoe interior into upper and lower halves and each of the outer chambers afforded by the partitions has a delivery conduit 78 for the supply of hot coating material from a pressure pump source.

The central partition has a number of communicating openings as at 79 arranged to distribute and spread the oncoming hot liquid throughout the length of the entrance chamber to eliminate cold spots and to pass the liquid into the inner chamber from which it discharges under pressure through the openings or spray nozzles 80 toward the pipe surface. Any over spray or excess material dripping from the pipe surface is collected in a tray or sump pan 81 for recirculation by the pump. Projecting from one side of the shoe are two or more studs 82 for slidably guiding an annular shield 83 shaped as an outwardly facing trough to be fitted interiorly of the shoe and to have a movement axially of the shoe upon the support studs 82. The range of movement will carry the shield into and out of blocking relation to the spray discharged from the nozzles 81. The movement is transmitted through a pair of arms 84 dependent from a transverse rod 85 which extends laterally at one end beyond the shoe for reception within the forked end of a hand lever 86 suitably fulcrumed on the machine at 87. In one position of the hand lever the shield will be located as seen in Fig. 21 to clear the nozzles for application of coating material on the pipe traveling through the shoe. Under control of the hand lever the shield can be shifted to the spray intercepting position illustrated in Fig. 21. The cylindrical skirt of the shield 83 is spaced far enough from the spray jet openings to provide ample jet clearance and has no outwardly projecting parts to move in a path to wipe an accumulation of paint over the breaker ring 93 and into clogging relation to the spray openings. Instead the skirt nose end beyond the annular peripheral groove or trough 91, is beveled or tapered to seat against an internal rib or circular ring 92 welded to the shoe 75. In the usual operation of the equipment the shield is frequently in spray intercepting position and the flow of hot liquid keeps it hot to preclude an accumulation of cold paint and to run off the paint to the sump 81.

Air-bubbles inevitably entrained in the hot liquid will tend to separate out in the hollow shoe chambers. They will present no problem of air locking in the bottom half because the upper portions have the outlet openings to rid the chambers of separated air. However, in the upper half of the shoe the spray openings are considerably below the upper portion of the flow chambers and the separation of air-bubbles with the formation of a large void or air pocket can be a serious air-lock problem. To solve this problem it is proposed to form a chamber enlargement 88 at the top center of the shoe and provide in it a vent tube 89 having an orifice fitting 90 at its upper end. This vent will prevent the formation of an air-trap by allowing a continuous small discharge through the orifice for unrestricted flow through the vent pipe. It will be kept warmed by the flow of hot fluid around it and will remain unclogged. So that unwanted drip from the vent onto the pipe will not occur the vent tube curves downwardly along one side of the shoe for discharge at its lower end beyond the range of pipe and into the tray 81.

While electro-pneumatic tripper controls have been referred to, it will be understood that any tripper can be directly linked to a fluid control valve and also that other than fluid motive force for actuation of the parts may be employed.

From the foregoing description it will be apparent that mechanism is provided which not only handles the pipe travel automaically without manual effort but it also enables a continuing operation without interruption of pipe travel except at momentary intervals for renewing the roll supply of wrapping materials.

The invention herein specifically described is capable of various modifications as come within the scope of appended claims.

What is claimed is:

1. Handling equipment for pipe including spaced apart priming and coating machines, conveyors leading to and from each machine, a pipe storage rack located in advance of the conveyor leading to the priming machine, a pipe storage rack located in space bridging relation to the conveyors leading from the priming machine and to the coating machine and a pipe rack located in trailing relation to the conveyor leading from the coating machine, escapement mechanisms at the discharge ends of both storage racks in advance of the conveyors leading to both machines and operable to feed one pipe at a time successively from the racks while blocking feed of other pipes on each rack, control devices therefor arranged in the path of and to be engaged by pipe traveling on the conveyors for the automatic actuation of the escapement mechanisms, means to transfer pipe from the conveyors leading from the machines to the loading ends of adjacent storage racks and pipe actuated control devices governing automatic actuation of said means by the engagement therewith of pipe moved by the conveyors to given transfer points.

2. Handling equipment for pipe to be coated, including a pipe surface preparing station and a pipe coating station, pipe conveyors leading to and from both stations, a pipe storage rack arranged for gravity feed of pipe sections successively to the initial conveyor, escapement mechanism therefor confining delivery to one pipe sections for each operation thereof, escapement operation control arranged in the path of and to be tripped by a pipe section moving on said initial conveyor in a given zone of travel, a pipe storage rack of the gravity advancing type having its loading end adjacent the conveyor leading from said preparing station and its discharge end adjacent the conveyor leading to said coating station, pipe transfer mechanism responsive to pipe position on the conveyor at the said loading end to shift the pipe from the conveyor to the rack, escapement mechanism operable to feed one pipe at a time to the conveyor leading to the coating station in response to a preceding pipe position, a final storage rack extending transversely to the travel direction of the conveyor leading from the coating station and means operable to transfer pipe to the final storage rack in response to its position on the last mentioned conveyor.

3. In pipe treating equipment of the character described, a conveyor for moving pipe axially thereof, a gravity advancing pipe rack storing pipe in parallel succession and having its discharge end leading to the loading zone of said conveyor to feed pipe thereto one at a time, a pair of retractable-projectible plungers mounted to extend alternately above and below the pipe engaging rack at said discharge end and spaced apart a distance approximating the pipe diameter, a rock lever connecting said plungers for alternate projection and retraction into and out of the path of the last and next to last of the racked pipe, a fluid pressure motor for cycling the operation of said rock lever, a control valve therefor and a valve actuating tripper in the path of pipe traveling on said conveyor and responsive to pipe travel in and out of the conveyor loading zone from the rack discharge end.

4. The structure of claim 3 and space maintaining guides for said plungers and means adjustably mounting said guides for a variable width setting thereof in relation to variations between different diameter type to be treated.

5. The structurer of claim 3 wherein one of the plungers carries a pipe stop adjustably connected thereto for varying its distance from the other plunger in accord with diameter of pipe being processed.

6. Pipe handling equipment including a gravity feed storage rack for pipe sections laid in parallel succession transversely of the rack, a conveyor adjacent the lower end of the rack for carrying successive pipe sections in the direction of their longitudinal extent, a pipe engaging member movable into and out of the path of gravity fed pipes successively from the rack to the conveyor, operating mechanism therefor, a tripper control for said mechanism operable to effect passage of one pipe for each actuation thereof, and means mounting said tripper control in the path of and for engagement by a conveyor carried pipe section to position the tripper control in an inoperative condition until such pipe travels beyond and out of engagement therewith.

7. Pipe handling equipment including a gravity feed storage rack for pipe sections laid in parallel succession transversely of the rack, a conveyor adjacent the lower end of the rack for carrying successive pipe sections in the direction of their longitudinal extent, a pipe engaging member movable into and out of the path of gravity fed pipes successively from the rack to the conveyor, operating mechanism therefor, a tripper control for said mechanism operable to effect passage of one pipe for each actuation thereof, and means mounting said tripper control for its actuation in response to travel of a conveyor carried pipe into a given zone.

8. The structure of claim 7 together with pipe engaging frictional power drive means associated with said conveyor.

9. Pipe handling equipment including a machine for operating on pipe sections fed axially therethrough at a given rate of travel, a conveyor for the feed of pipe sections successively into said machine, a storage rack for supplying pipe sections to the conveyor, tripper mechanism responsive to the travel on the conveyor of an advancing pipe section into a given zone to supply another pipe section from the rack to the conveyor and driving means to advance the last mentioned pipe section on the conveyor at a speed in excess of the said given rate of travel until its forward end abuts the rearward end of the preceding pipe section for insuring a continuity of pipe surface operated on by the machine.

10. In combination, a conveyor for pipe traveling in the direction of its axis, a pipe storage rack having its loading zone adjacent the conveyor for transfer of pipe for storage in parallel succession, a pipe engaging lifter ramp extending transversely of the path of pipe on the conveyor and being inclined toward the rack loading zone for the gravity travel of the pipe therefrom, a swinging crank arm fulcrumed to swing about an axis transverse to and through the arc extending in the direction of conveyor travel and secured at its free swinging end to said ramp and power means joined to said crank arm and operative to swing the same and shift said ramp upwardly and longitudinally in the direction of and at a rate faster than conveyor travel.

11. Pipe handling equipment, including a pipe treating machine having a discharge track on which treated pipe travels axially, a pipe treatment seasoning rack extending transversely beside the track, spaced elevators having pipe engaging rails vertically inclined tranversely to the direction of travel and toward the rack and arranged to lift pipe from the track and cause it to roll on to the rack, raising and lowering mechanism for said elevators, a control device responsive to traveling pipe position for automatically timing the operating cycle of said mechanism and means positioning said control device at a given point in the path of a treated pipe on the track for engagement by a track supported traveling pipe as it reaches alignment with said rack.

12. Pipe handling equipment, including a stationary pipe coating machine through which pipe travels and receives a soft coating which later hardens as a protective sheathing, a series of co-operating rotatable wheels located beyond the discharge side of the machine for conveying coated pipe therefrom and treaded with cushion facing for rolling contact with the coating and for minimizing extrusion of the coating from the contact area as the traveling coated pipe rolls forward from the machine, means mounting said wheels in pairs closely spaced together in the direction of pipe travel for low unit load distribution, and with the axes of each pair divergently related to position the paired wheels in inclined planes conforming to an inverted V with their treads running in paths at the top spaced a distance apart less than pipe diameter and presenting a pipe supporting valley.

13. The structure of claim 12 wherein the spacing in the direction of pipe travel of the axes of successive pairs of wheels is such that the treads of succeeding wheels have small running clearance for a length immediately beyond the discharge side of the machine and which spacing increases beyond a distance from the machine sufficient for an interval in which the applied coating has started to set.

14. In a hot coating and cooling of pipe, a machine for applying a hot coating on a traveling pipe, a cooling zone behind the machine, a succession of supporting wheels beyond said cooling zone, means to flood cooling liquid on the hot coating in said cooling zone before the pipe coating engages said supporting wheels, a sump to collect said liquid and receiving the wheels therein and means to control liquid level in the sump at a height above the bottoms of the wheels for cooling the wheel treads.

15. Pipe handling equipment including a machine for applying a hot coating to a pipe surface, a row of idler wheels positioned beyond the machine for conveying hot coated pipe from the machine, a series of cooling liquid spray nozzles to flood the hot coating for absorbing heat therefrom, a sump to receive the sprayed liquid in which the wheels move at the bottom of their paths of rotation and a liquid circulating pump having an inlet connection with said sump at a level above the bottoms of the wheels and an outlet connection with said spray nozzles.

16. In a pipe coating machine, an annular spray coating shoe having inwardly directed nozzles to deliver a continuous flow of coating toward the path of pipe traveling through the shoe, a breaker ring carried by the shoe in inwardly projecting relation adjacent said nozzles, an annular trough ring to telescope inside the shoe into and out of the path of nozzle delivery, with its annular trough serving to convey the coating material in pipe shielding relation and an outwardly projecting annular rib ahead of the trough for co-operation with said breaker ring in reducing accumulation on the nose of the trough ring of sprayed material and wiping the same during relative telescopic travel of the shoe and trough ring so as to minimize smearing of the material into clogging relation with the nozzle passages.

17. In a coating machine of the character described a hollow shoe positioned adjacent the path of articles to be coated, means to supply coating material under pressure to the interior chamber of the shoe, discharge nozzles leading from the shoe chamber for application of the coating material on an article and a bleed orifice leading from the top of the chamber for continuous bleed-off discharge and avoidance of entrapment of air upon separation and rise of air bubbles entrained in the coating material supplied to the shoe.

18. In a pipe coating machine, a hollow annular shoe for passage therethrough of the pipe to be coated, inwardly directed delivery nozzles carried by the shoe, an air collecting pocket at the top of the shoe, and a vent tube affording a constricted flow path leading from the pocket and extending laterally beyond the side of the path of the traveling pipe to a discharge end beyond the vertical planes containing the pipe for clearing the path of the pipe by drippings from said vent tube.

19. In a device for applying hot liquid coatings, a hollow shoe having an interior tubular partition subdividing the shoe radially into a pair of concentrically nested chambers, one surrounding the other in heat exchange relation, a series of delivery nozzles leading from one of said chambers and a supply conduit for hot coating material leading to the other chamber, said tubular partition having spaced apart distributing passages extending radially therethrough each to constrict flow and thereby compel equalization of flow of hot coating material throughout the length of the nozzle feeding chamber to reduce the formation of cold spots.

20. The structure of claim 19 wherein the chamber to which the supply conduit feeds hot coating material has an air collecting pocket at the top thereof and a bleed orifice affords continuous restricted discharge from said air pocket.

References Cited in the file of this patent
UNITED STATES PATENTS

| | | |
|---|---|---|
| 2,336,533 | Dilworth | Dec. 14, 1943 |
| 2,370,254 | Michelson | Feb. 27, 1945 |
| 2,393,023 | Cox et al. | Jan. 15, 1946 |
| 2,574,706 | Perrault | Nov. 13, 1951 |
| 2,602,415 | Hall | July 8, 1952 |